Jan. 12, 1926. 1,569,565
H. A. MYERS
COIN CONTROLLED MECHANISM FOR WEIGHING SCALES
Filed Oct. 1, 1919 5 Sheets-Sheet 1

Witness
C. E. Wilcox.

Inventor
Hubert A. Myers.
By George R. Frye
Attorney

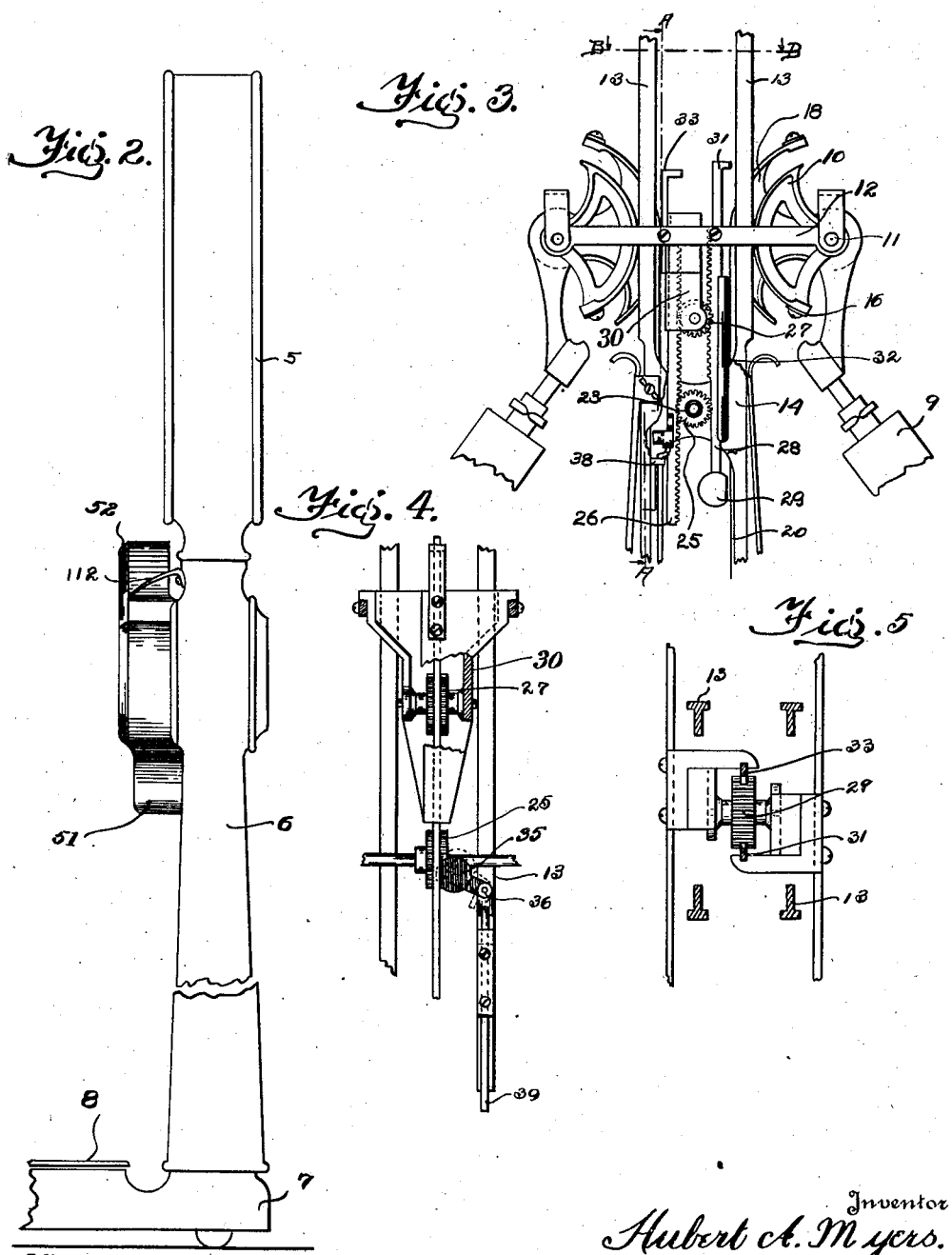

Jan. 12, 1926.
H. A. MYERS
1,569,565
COIN CONTROLLED MECHANISM FOR WEIGHING SCALES
Filed Oct. 1, 1919
5 Sheets-Sheet 3
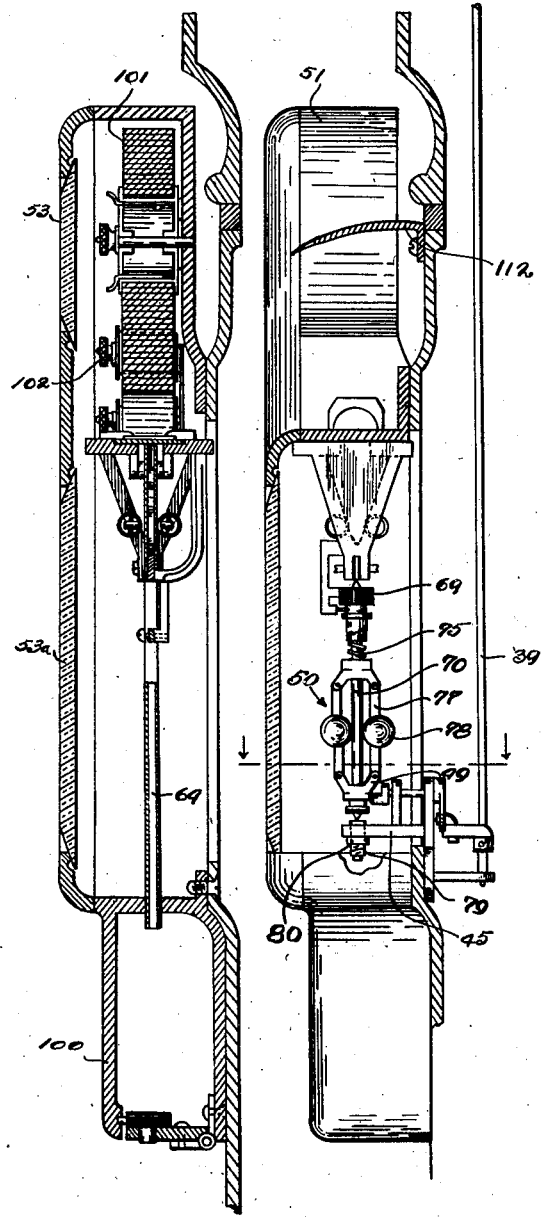
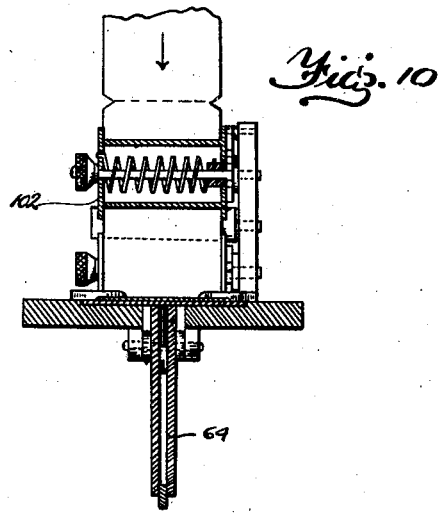
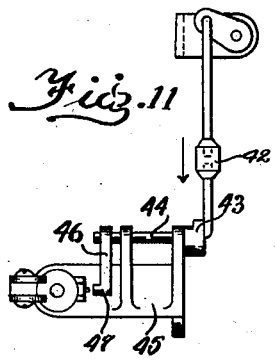
Witness
C. E. Wilcox.
Inventor
Hubert A. Myers.
By George R. Frye
Attorney Jan. 12, 1926. 1,569,565
H. A. MYERS
COIN CONTROLLED MECHANISM FOR WEIGHING SCALES
Filed Oct. 1, 1919  5 Sheets-Sheet 4

Witness
C. E. Wilcox

Inventor
Hubert A. Myers.
By George R. Frye
Attorney

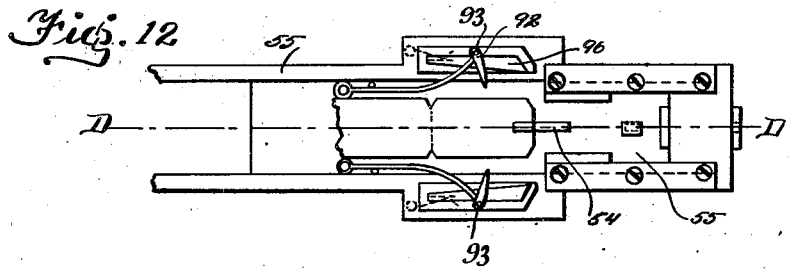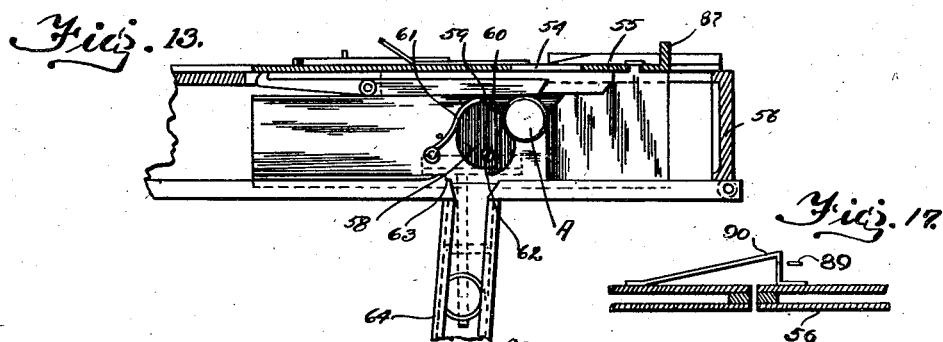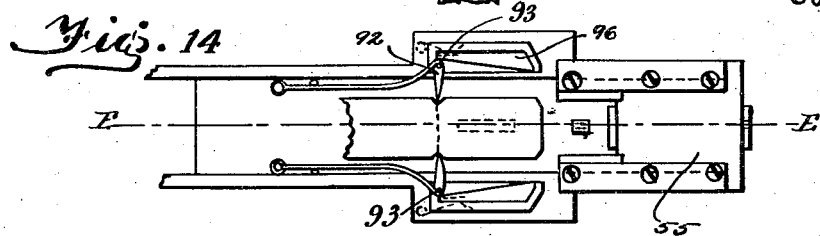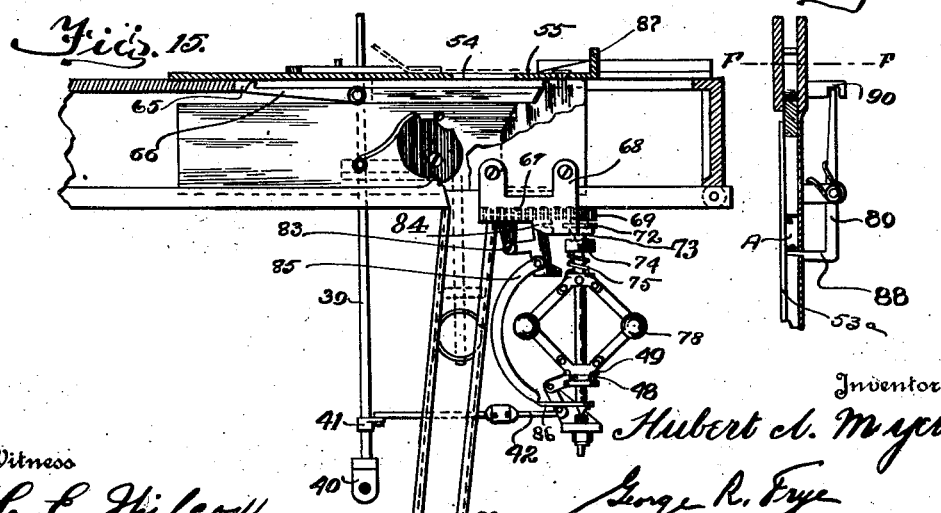

Patented Jan. 12, 1926.

1,569,565

UNITED STATES PATENT OFFICE.

HUBERT A. MYERS, OF TOLEDO, OHIO, ASSIGNOR TO TOLEDO SCALE COMPANY, OF TOLEDO, OHIO, A CORPORATION OF NEW JERSEY.

COIN-CONTROLLED MECHANISM FOR WEIGHING SCALES.

Application filed October 1, 1919. Serial No. 327,773.

*To all whom it may concern:*

Be it known that I, HUBERT A. MYERS, a citizen of the United States, residing at Toledo, in the county of Lucas and State of Ohio, have invented certain new and useful Improvements in Coin-Controlled Mechanism for Weighing Scales, of which the following is a specification.

This invention relates to coin-operated controlling devices for weighing scales, and more particularly weighing scales in which the indicating means is normally held locked or in inoperative position and is operable only upon the insertion of a coin or check.

Among the principal objects of this invention is the provision of a simple and efficient controlling apparatus particularly adapted for use with scales for the weighing of persons.

Another object is the provision of a coin-operated controlling device which is entirely free from contact with the weighing mechanism at the time when the weight indication is displayed so that there can be no interference with the weighing mechanism of the scale to injuriously affect the accuracy thereof.

Another object is to provide a coin-controlled mechanism that can be manufactured separately from and used as an auxiliary to the weighing mechanism of the scale and which can be readily fixed in operative position upon the scale and as readily detached therefrom.

With the above and other objects in view which will readily appear from the following description, my invention consists of the novel construction, combination and arrangement of elements to be hereinafter more fully described, illustrated in the accompanying drawings, and particularly pointed out in the subjoined claims.

Reference is to be had to the accompanying drawings illustrating a preferred embodiment of my invention and wherein similar reference characters designate similar parts throughout the several views.

In the drawings:—

Figure 2 is a side elevation of the scale, with parts broken away;

Figure 3 is a detail elevation of the load-offsetting mechanism and the connection therefrom for operating the indicating mechanism in an intermediate position;

Figure 4 is a detail section on the line A—A of Figure 3, with parts broken away;

Figure 5 is a detail sectional view taken on the line B—B of Figure 3;

Figure 8 is a longitudinal section taken substantially on the line A—A of Figure 6;

Figure 9 is a similar view taken substantially on the line B—B of Figure 6;

Figure 10 is a transverse section through the coin chute;

Figure 11 is a detail view of the mechanism for locking the brake rod under control of the fly-ball mechanism;

Figure 12 is a plan view of the slidable coin-carrying mechanism;

Figure 13 is a longitudinal section through the mechanism shown in Figure 12, taken substantially on the line D—D of Figure 12;

Figure 14 is a plan view of the mechanism shown in Figure 12, with parts shown in the positions at the end of the advance movement;

Figure 15 is a sectional elevation of the mechanism shown in Figure 14, taken substantially on the line E—E of Figure 14, and a detail elevation of the fly-ball mechanism when released.

Figure 16 is a detail section, with parts in section, of the coin-retarding means; and Figure 17 is a detail section on the line F—F of Figure 16.

Figure 1:
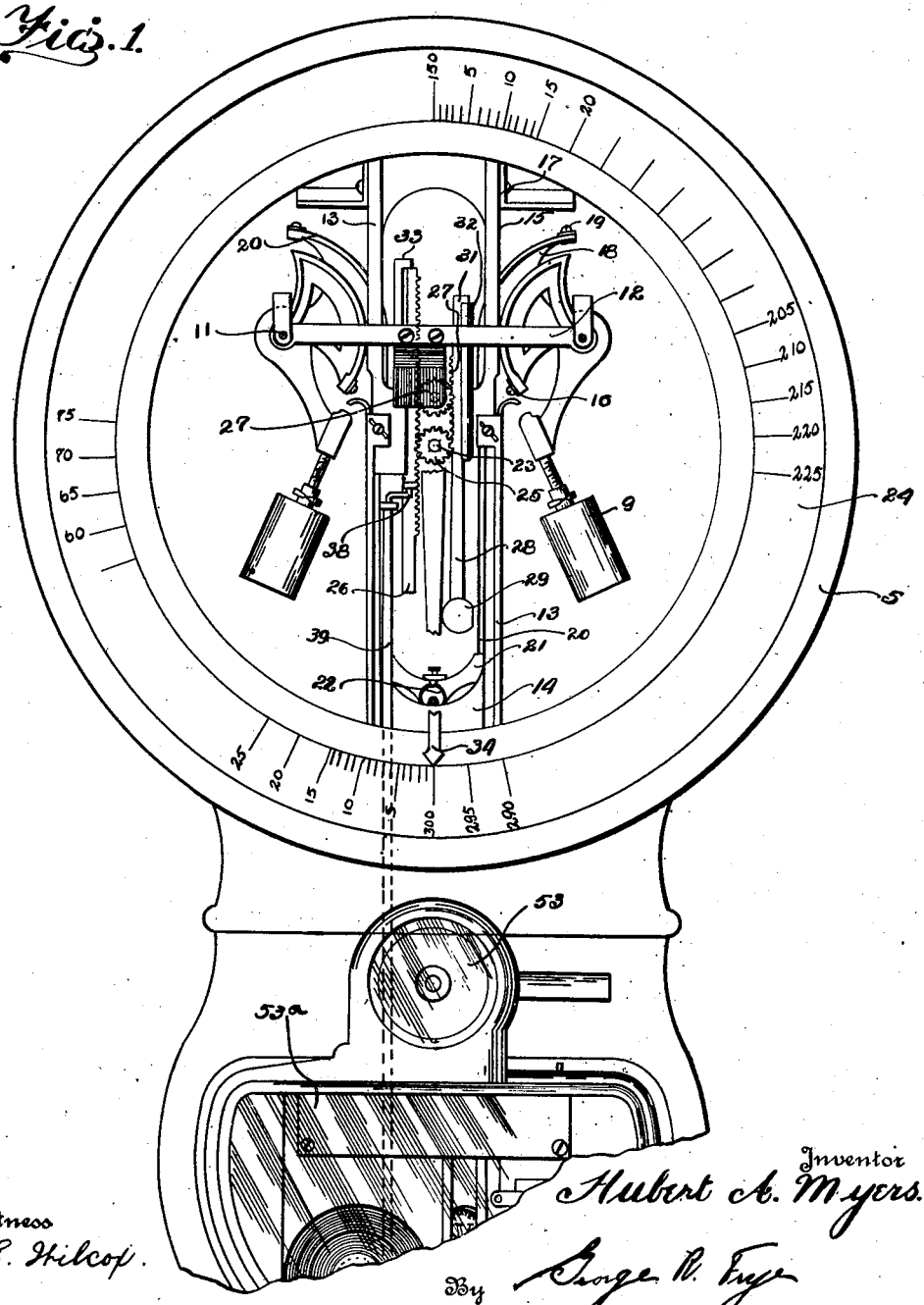
Figure 1 is a front elevation of the upper part of a weighing scale equipped with my improved mechanism, portions being broken away to show the indicating means and load-offsetting means of the scale in their normal positions.

Referring to the drawings, 5 designates a scale housing adapted to enclose the load-offsetting or counterbalancing mechanism of the scale and supported upon a suitable column 6, the lower end of which is associated with the base 7 of the scale enclosing the platform lever mechanism supporting the scale platform 8. It is to be understood that any suitable platform and platform lever mechanism may be employed in connection with the weighing or load-offsetting mechanism of the scale, and that the weighing mechanism of the scale may be of any approved type, various mechanisms well known in the scale art being fully capable of performing the required functions. The embodiment herein illustrated is one that has been found to successfully demonstrate the capabilities of this invention, and shows a double pendulum scale of a well-known type adapted to be suitably connected with the platform lever mechanism of the scale so that upon the placing of a load upon the scale platform 8 the pendulums will be moved to a position counterbalancing the weight of the load on the platform. Inasmuch as the present invention is not dependent upon any particular form of scale mechanism, no attempt is made in this application to show a complete scale mechanism nor to delineate the action of the scale in its load-offsetting or weighing operations, only so much of the scale mechanism being shown as is necessary to clearly portray the operation and co-action of the coin-controlled mechanism associated with the scale mechanism and forming the claimed invention herein disclosed.

As herein shown, the pendulum load-offsetting mechanism comprises a pair of oppositely-disposed pendulums 9, each of which comprises a pair of segments 10 secured upon transverse shafts 11, and the two shafts are connected together by crossbars 12, as clearly shown in Figure 1, the segment shafts 11 and crossbars 12 forming a flexibly-connected rectangular frame connecting the two pendulums. A rectangular frame having four vertical pillars 13 is suitably supported from the wall of the scale housing and secured together at the top and bottom by crosspieces 14. The pillars 13 form bearings or tracks for the rocker segments 10 which have rolling contact thereon, being supported in position by flexible ribbons 15 of steel or other suitable metal fastened to the lower ends of the segments, as at 16, and at their upper ends to the pillars, as at 17, being thus interposed between the pillars and the segments at every position of the latter. Since the segments 10 of each pendulum are concentric, the rear segment is directly behind the front segment, and therefore does not show in Figures 1 and 3. Intermediate the members of each pair of supporting segments 10 is a somewhat larger segment 18 which is also fixed, as by dowel pins, to the shafts 11, said segment extending at its periphery between the pillars upon the same side of the rectangular frame and being connected at its upper end, as at 19, to a flexible metallic ribbon 20 which extends over the arcuate face of the segment and is attached at its lower end to an equalizer bar 21. The construction of the two pendulums is substantially identical, and the ribbons 20 are attached to opposite sides of the equalizer bar 21, which is pivotally connected to a link 22 which in turn is suitably connected, as by a steelyard (not shown), to the platform lever mechanism of the scale, the construction being such that whenever a load is placed upon the scale platform a downward pull is exerted upon the equalizer bar 21, which is transmitted through the ribbons 20 to the larger segments 18, causing the swinging of the pendulums so that the pendulum weights are raised to a position counterbalancing the weight of the load on the platform. During the swinging movement of the pendulums to offset the weight of the load, the crossbars 12 are moved vertically upward, and through the medium of this vertical movement of the crossbars the weight indication is effected.

The indicating mechanism of the scale comprises an indicator shaft 23 mounted concentrically of the dial 24 having the weight graduations thereon, and upon the indicator shaft 23 is affixed a pinion 25 adapted to mesh with a vertically-reciprocating rack rod 26 which also meshes with a larger pinion or gear 27 mounted in depending brackets 30 carried by the crossbars 12, and which meshes on the opposite side of its periphery with a vertically-reciprocating rack 28 having a weighted rack foot 29 at its lower extremity. The weighted rack 28 meshes only with the gear 27 and is formed at its upper extremity with a lateral arm 31 which is adapted to rest upon the upper surface of a bracket 32 when the weighing mechanism is in its normal position, the bracket 32 being secured upon the framework of the scale (see Figures 1 and 3). The reciprocating rack 26 meshes with both the pinion 25 on the indicator shaft and with the larger pinion 27 carried by the crossbars 12, and when the weighing mechanism of the scale is in its normal position the upper surface of the rack 26 is contacted by the lateral arm 33 of an upwardly-extending bracket carried by the crossbars 12. The indicator hand 34 is suitably secured upon the forward extremity of the indicator shaft 23 in the usual manner.

Figures 6, 7:
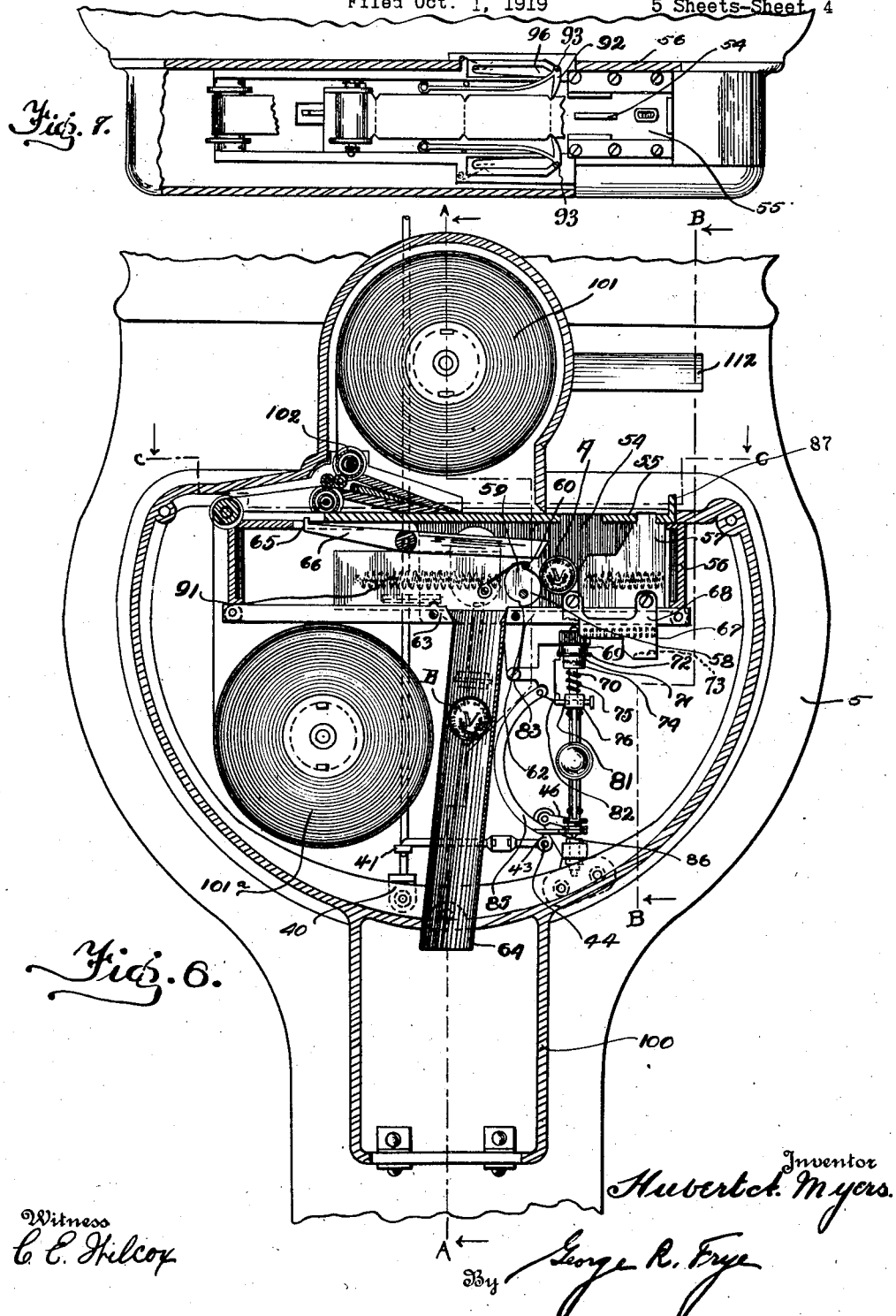
Figure 6 is a front elevation, with parts in section, of the coin-controlled mechanism and portions of the weighing mechanism.
Figure 7 is a transverse section taken substantially on the line C—C of Figure 6.

The indicating mechanism above described is so constructed and connected that no indication will be given upon the operation of the weighing mechanism of the scale because of the locking of the indicating mechanism by the coin-controlled locking and releasing mechanism now to be described. A brake 35 (see Figure 4) is pivotally mounted upon a bracket 36 secured upon one of the pillars 13 of the scale, and this brake is formed as a bellcrank lever, the lower arm of which is connected for oscillation with the crank or eccentric arm 38 formed at the upper end of the brake rod 39, the lower end of which extends below the housing 5 of the scale into the upper portion of the column 6, the lower extremity being supported upon a bracket 40 secured to said column, as shown in Figures 6 and 15. The normal position of the brake 35 is shown in full lines in Figure 4 and the arrangement is such that upon the rotation of the brake rod 39 the lower arm of the bellcrank lever is swung into the position shown in dotted lines in Figure 4, lifting the brake out of contact with the rack 26 upon which the head of the brake bears when the weighing mechanism is in normal position. An apertured lug extending from the bracket 36 forms a guide for the upper end of the brake rod 39.

Adjacent its lower extremity the brake rod 39 carries an offset arm or eccentric 41 which is connected, as by means of the adjustable connecting link 42, with the eccentric arm 43 secured at one end of the rock shaft 44 (see Figure 11), the shaft 44 being mounted in a bracket 45 secured upon the column 6 of the scale. The eccentric arm 46 is secured adjacent the opposite extremity of the shaft 44 and carries at its outer extremity a wrist pin 47 fitting into the circular slot 48 upon the sleeve 49, which sleeve is connected to the governor or timing mechanism 50 so as to be capable of both rotary and reciprocating movements, as will be hereinafter more fully described. When the weighing mechanism of the scale is in normal position, the eccentric arm 43 extends downwardly in a substantially vertical position, as shown in Figure 6, while the eccentric arm 46 extends in substantially a horizontal position, both of the arms 43 and 46 being securely fixed upon the shaft 44, the arrangement being such that a rocking movement imparted to the arm 46 through the vertical movement of the sleeve 49 will also rock the arm 43, and this movement will be imparted through the adjustable connecting link 42 to the horizontally-extending eccentric arm 41 upon the brake rod 39 so that the brake rod 39 will be partially rotated to swing the brake 35 out of contact with the rack 26.

The coin-operated controlling mechanism is enclosed within a housing 51 of substantially the shape shown in Figures 2 and 6 and adapted to be secured upon the forward portion of the column 6 to which it is secured by screws or other suitable fastening means. The front of the housing 51 is formed as a scroll 52 and carries an upper and lower glass plate 53 and 53ª respectively, through which may be seen the ticket rolls, coin-chute, governor mechanism, and other elements of the controlling device. As shown in Figures 6 and 7, a slot 54 for the insertion of a coin or check is located in the upper plate 55 of a slidable coin-carrying mechanism which is mounted for reciprocating movement within a frame 56 carried by the housing 51. The slot 54 is arranged above the inner end of a thrust plate 57, which is provided at its upper corner with an inclined portion to guide the coin after its insertion through the slot into substantially the position of the coin A shown in Figure 6 of the drawings, wherein the edge of the coin contacts with the end wall of the thrust plate 57 and the adjacent edge of an irregularly-shaped baffle plate 58 pivoted eccentrically upon a pin mounted in the opposite side walls of the slidable coin-carrying mechanism. At its upper extremity the baffle plate 58 is formed with a shoulder 59 adapted to normally contact with a stop 60 secured in the frame of the slide mechanism, the shoulder 59 being pressed into this position by the leaf spring 61, as shown in Figure 13. At its lower extremity the baffle plate 58 is formed with a shoulder 62, as shown, to contact with an upwardly-extending lug 63 upon the base of the supporting frame 56 as the slidable coin-carrying mechanism approaches the limit of its sliding movement, the lug 63 being positioned to engage the shoulder 62 and stop the motion of the lower portion of the baffle plate 58 slightly before the coin-carrying mechanism finishes its stroke, the further movement of the coin-carrying mechanism then serving to rotate the baffle plate 58 into substantially the position shown in Figure 15, in which position the edge of the baffle plate is moved sufficiently away from the edge of the thrust plate 57 to allow space for the passage of the coin into the coin-chute 64, the coin falling by gravity into the coin-chute as soon as sufficient passageway has been yielded by the swinging movement of the baffle plate 58. Upon falling in the coin-chute 64 the coin is arrested by the hook 88 of the lever 89 forming the coin-retarding means whereby the coin or check inserted by any person is held back of the glass plate 53ª in plain view of the by-standers and the next person to use the scale. The lever 89 is overweighted at its lower arm and is pivoted as shown in Figure 16 with the hook 88 normally extending through an opening in the rear wall of the coin-chute to block the passage of a coin, the upper arm of the lever 89 being positioned adjacent the inclined guide-lug 90 shaped and situated to rock the lever 89 upon the sliding movement of the coin-carrying mechanism to release the coin previously held by the hook 88. The coin-carrying mechanism is normally capable of limited sliding movement and is prevented from moving beyond this limit by the upwardly-projecting lug 65 at the rear end of the lever 66, which lever is pivoted intermediate its ends upon a shaft carried by the frame 56 and is provided with a forward arm of greater weight than the rear arm carrying the lug 65 so that the lug 65 is normally held in raised position. The free end of the forward arm of the lever 66 is inclined, as shown in Figure 6, and this inclined portion is arranged so as to be contacted by the upper portion of a coin held between the baffle plate 58 and thrust plate 57 during the sliding movement of the coin-carrying mechanism. When the coin contacts the inclined portion of the lever 66 the forward arm of the lever is forced upwardly, lowering the lug 65 upon the rear extremity of this lever out of the path of movement of the top plate 55 of the coin-carrying mechanism, the lever remaining in this position with the lug lowered until the coin-carrying mechanism is returned to its normal position (see Figures 13 and 15). A horizontal rack 67 formed upon a bracket 68 secured to the coin-carrying mechanism meshes with a pinion 69 loosely surrounding the vertical shaft 70 adjacent its upper end, the pinion being formed with an elongated sleeve 71, the lower edge of which is formed with ratchet teeth so as to form one face of a clutch mechanism hereinafter to be described. The sleeve 71 also carries a collar 72 arranged so that its lower wall will be engaged by the inclined face of the lug 73 formed on the lower extremity of the bracket 68 during the movement of the bracket plate with the coin-carrying mechanism. A sleeve 74 having its upper edge serrated with ratchet teeth conforming with those upon the lower edge of the sleeve 71 is loosely mounted upon the shaft 70 and is connected to the upper extremity of a coil spring 75 surrounding said shaft, the lower end of which spring is connected to a collar 76 fixed by means of a set screw to the shaft 70, the collar 76 being formed with oppositely-disposed apertured ears in which are pivoted the upper extremities of the toggles 77 forming a fly-ball mechanism utilized as a timing device in the operation of the coin-controlled mechanism, as will be hereinafter described. The toggles 77 carry the weights 78 substantially as shown, and are pivoted at their lower extremities to apertured ears extending from the sleeve 49, which is free to move longitudinally of the shaft 70 and is formed with the circular slot 48 in which reposes the wrist pin 47 upon the eccentric arm 46 of the rock shaft 44, as hereinafter described. The extremities of the shaft 70 are preferably of hardened steel formed as cones engaging bearings of hardened metal respectively carried by the frame 56 and the adjusting screw 79 threaded in the bracket 45, as shown in Figures 9 and 15. The bearing screw 79 is retained in any adjusted position by means of the lock nut 80.

A pin or lug 81 extends radially from the collar 76, as shown in Figure 6, and normally engages the lower arm of the link 82, which is pivoted, as at 83, upon a bracket depending from the frame 56, the link 82 being preferably bifurcated and arranged as shown, with its lower arm normally in engagement with the pin 81 and its upper arm provided with forked arms 84 straddling the collar 72 upon the sleeve 71. A curved retaining link 85 is pivoted at its upper extremity to the lower arm of the link 82, and at its lower extremity is formed with an apertured plate 86 surrounding the shaft 70 and arranged immediately below the sleeve 49, the aperture in said plate 86 being of slightly greater diameter than the diameter of said shaft so as to allow for rocking movement of the link 85.

The operation of the coin-controlled mechanism so far described with relation to the scale mechanism will now be given. When a person stands upon the platform 8 of the scale, the pendulums 9 are swung upwardly to a position offsetting the weight of the person upon the platform, the crossbars 12 connecting the pendulums 9 being moved upwardly in accordance with the displacement of the pendulums, carrying the arm 33 of the upwardly-extending bracket secured to the crossbars 12 a distance above the upper end of the rack 26 proportional to the displacement of the pendulums. The larger pinion 27 mounted in brackets upon said crossbars is also carried upwardly therewith, but since the rack 26 is firmly clamped in position by means of the brake 35, the upward movement of the pinion 27 will not carry with it this rack 26. Instead, the teeth of the rack 26 act as a cog-rail or track upon which the pinion 27 advances upwardly, lifting in its advance the weighted rack 28 with which the pinion 27 also meshes. The rack 28 is therefore moved upwardly a distance proportional to the displacement of the crossbars 12, which of course is governed by the displacement of the pendulums 9 in counterbalancing weight upon the scale platform. Thus, the weight of the person upon the platform 8 is counterbalanced by the weighing mechanism of the scale, but no indication of the weight is given upon the indicating mechanism until after the brake 35 is detached from its engagement with the rack 26. To release the brake 35 it is necessary to insert a coin or check into the slot 54 of the coin-carrying mechanism, the coin immediately falling into the position shown by the coin A in Figure 6. The coin-carrying mechanism is then slid inwardly by grasping the projecting lug 87 upon the top plate 55, the coin moving with the coin-carrying mechanism to first rock the lever 66 to lower the lug 65 out of the path of movement of the top plate 55 and then to fall into the coin-chute 64 after the baffle plate 58 has been swung out of the path of travel of the coin by contact of the shoulder 62 of said baffle plate with the projecting lug 63. The coin upon falling into the coin-chute is caught by the hook 88 of the coin retarding means, as hereinbefore described, the coin B previously held by the hook 88 having fallen into the coin receptacle 100 as the upper extremity of the lever 89 was thrown inwardly by the inclined lug 90 during the sliding movement of the coin-carrying mechanism. Simultaneously, the sliding movement of the coin-carrying mechanism has rotated the pinion 69 through its engagement with the horizontal rack 67, the rotation of the pinion 69 serving to wind up or tighten the coils of the spring 75, and as the coin-carrying mechanism reaches the limit of its sliding movement the inclined face upon the lug 73 engages the collar 72 upon the sleeve 71, lifting the sleeve 71 and thereby rocking the link 82 upon its pivot so as to swing the lower arm of said link out of engagement with the radially extending pin 81 carried by the collar 76 to release the fly-ball mechanism, permitting it to be rotated under impulse of the wound-up spring 75. The lifting of the sleeve 71 also detaches the serrated clutch faces upon the sleeves 71 and 74 respectively to allow the free rotation of the sleeve 74 in conjunction with the fly-ball mechanism under the impulse of the wound-up spring 75, the detachment of the serrated clutch faces being aided by the drawing downward of the sleeve 74, as the coils of the spring 75 were tightly wound. As the fly-ball mechanism rotates, the weights 78 swing outwardly into substantially the position shown in Figure 15, the sleeve 49 pivoted to the lower extremities of the toggles 77 being thereby lifted upon the shaft 70, the lifting of this sleeve 49 serving to rock the shaft 44 with its eccentric arms 43 and 46 so as to partially rotate the brake rod 39, to which the arm 43 is connected through the adjustable link 42. The rotation of the brake rod 39 swings the brake 35 into the position shown in dotted lines in Figure 4, releasing the rack 26 so that it is free to move to indicate through the indicating mechanism of the scale the weight of the person upon the platform 8. Freed from the brake 35, the rack 26 is moved upwardly until its upper portion contacts with the lateral arm 33 of the bracket upon the crossbars 12, rotating in its upward movement the pinion 25 so as to swing the indicator hand 34 to its proper position indicating on the dial 24 the weight of the person upon the scale. The upward movement of the rack 26 is accomplished by the mechanism disclosed because of the fact that as soon as the brake 35 is released from the rack 26 the weighted rack 28 falls by gravity from its elevated position, rotating during its downward movement the larger pinion 27 which also meshes with the rack 26, the rotation of this pinion being communicated to the rack 26 to move it in the opposite—i. e., upward—direction. The rack 28 falls only through a distance equal to the upward movement of the rack 26, which is one-half the distance through which the rack 28 was moved in the first instance.

As soon as the person being weighed steps off the platform 8 the pendulums 9 fall by gravity, allowing the pinion 27 and the racks 26 and 28 to descend to their lowermost positions. The downward movement of the rack 26 returns the pinion 25 and indicator hand 34 to their original positions. As soon as the fly-ball mechanism has ceased rotating, the sleeve 48 is lowered by virtue of the inward movement of the weights 78, the lowering of the sleeve 48 serving to rock the shaft 44 and rotate the brake rod 39 to their original positions, thereby again swinging the brake 35 into contact with the rack 26. While the pressure of the brake is sufficient to prevent the rack bar 26 from moving upwardly as the slightly heavier bar 28 descends, it is not sufficient to prevent the bar 26 from being pushed downwardly by the bracket 33 as the heavy pendulums 9 descend when the load is removed from the scale and carry the cross bars 12 and bracket 33 downwardly. In its lowering movement the sleeve 49 contacts with the apertured plate 86 of the link 85, drawing the lower arm of the link 82 to which the link 85 is pivoted into the path of the pin 81, which, of course, has been rotated with the fly-ball mechanism; and when the pin 81 again contacts with the link 82 the rotation of the fly-ball mechanism ceases and the elements upon the shaft 70 assume their original positions. The coin-carrying mechanism is returned to its original position through the medium of coil springs 91 when the lug 87 is released by the operator.

I have disclosed in conjunction with this coin-controlled mechanism a ticket-issuing device adapted to be operated thereby. Since this ticket-issuing mechanism is specifically described and claimed in my copending application filed October 1, 1919, Ser. No. 327,775, I will here describe it in general terms only. The strip of tickets is carried upon a reel 101 mounted in a portion of the housing above the coin-operated mechanism, said strip taking over the roller 102 so that the free end of the strip lies on the upper plate 55 of the slidable coin-carrying mechanism. Pivoted on pins extending upwardly from the plate 55 is a pair of resilient arms carrying feed dogs 92 shaped substantially as shown in Figures 7, 12 and 14, and each provided with a downwardly-projecting guide piece 93 which extends into the irregularly-shaped slot formed in the frame 56. These pins are so directed by the pivoted guide 96 that as the plate 55 is reciprocated the pins move rearwardly along the outer sides of the slots and forwardly along the inner sides thereof. The dogs are thus held in engagement with the notches in the paper strip during the forward movement and out of engagement with the notches in the strip during the rearward movement, the strip being thus intermittently drawn from the reel so that its free end is projected from the housing at each operation of the device, and the ticket which forms the free end of this strip may be easily detached. A second strip is mounted on the reel 101ª which is located in the lower part of the housing and is arranged to be withdrawn from the reel by the ticket-issuing mechanism after the first strip has been consumed.

Suitable locking means are provided for preventing the unwarranted removal of the scroll 52, and a door provided with a suitable lock may be arranged to allow the removal of the coins in the coin receptacle 100 without exposing the operating mechanisms.

A cover plate 112 extends from the uppermost portion of the casing 51 over the slot 54 in the top plate 55 so as to protect the mechanism from rain, etc. when the scale is exposed in the open air.

While it will be apparent that the illustrated embodiment of my invention is well calculated to adequately fulfill the objects primarily stated, it is to be understood that this invention is susceptible to variation, modification and change without departing from the spirit and scope of the invention as set forth in the following claims.

Having described my invention, I claim:

1. In a device of the character described, the combination of weighing mechanism, independently-actuated indicating mechanism governed in its extent of movement by the weighing mechanism, means for locking the indicating mechanism in inoperative position, and coin-controlled mechanism for releasing the locking means, including a slidable coin-carrier normally limited in its movement, means for holding the coin in said carrier in position to release the carrier to permit it to travel its full stroke and a centrifugal device operable by a full stroke of said carrier and operatively connected to said locking means.

2. In a device of the character described, the combination of weighing mechanism, independently-actuated indicating mechanism governed in its extent of movement by the weighing mechanism, means for locking the indicating mechanism in inoperative position, and coin-controlled mechanism for releasing the locking means, including a slidable coin-carrier normally limited in its movement, means for holding the coin in said carrier in position to release the carrier to permit it to travel its full stroke, a centrifugal device operable by a full stroke of said carrier and operatively connected to said locking means and ticket-issuing mechanism actuated upon the operation of the coin-controlled mechanism.

3. In a device of the character described, the combination of weighing mechanism, independently-actuated indicating mechanism governed in its extent of movement by the weighing mechanism, means for locking the indicating mechanism in inoperative position, and coin-controlled mechanism for releasing the locking means, including a slidable coin-carrier, and mechanism intermediate the locking means and the slidable carrier operable upon movement of said carrier including a centrifugal device adapted to be spun by movement of said carrier.

4. In a device of the character described, the combination of weighing mechanism, independently-actuated indicating mechanism governed in its extent of movement by the weighing mechanism, means for locking the indicating mechanism in inoperative position, coin-controlled mechanism for releasing the locking means, including a slidable coin-carrier, mechanism intermediate the locking means and the slidable carrier operable upon movement of said carrier including a centrifugal device adapted to be spun by movement of said carrier, and ticket-issuing mechanism actuated upon the operation of the coin-controlled mechanism.

5. In a device of the character described, the combination of weighing mechanism, independently-actuated indicating mechanism governed in its extent of movement by the weighing mechanism, means for locking the indicating mechanism in inoperative position, and coin-controlled mechanism for releasing the locking means, including a slidable coin-carrier, and transmission mechanism intermediate the locking means and the slidable carrier operable upon movement of said carrier, including timing mechanism set into operation upon movement of the slidable carrier.

6. In a device of the character described, the combination of weighing mechanism, independently-actuated indicating mechanism governed in its extent of movement by the weighing mechanism, means for locking the indicating mechanism in inoperative position, and coin-controlled mechanism for releasing the locking means, including a slidable coin-carrier and transmission mechanism intermediate the locking means and the slidable carrier operable upon movement of said carrier, including timing mechanism set into operation upon movement of the slidable carrier, and ticket-issuing mechanism actuated upon the operation of the coin-controlled mechanism.

7. In a device of the character described, coin-operated controlling mechanism comprising a slidable member for receiving a coin, a baffle-plate pivoted eccentrically on said member arranged in the path of travel of the coin, and a locking lever for normally limiting the sliding movement of said member and arranged to be rocked by the coin when held by the baffle-plate during the sliding movement of said member.

8. In a device of the character described, coin-operated controlling means comprising a slidable member for receiving a coin, a rack carried by said member, a timing device set in operation upon the sliding movement of said member, including a pinion meshing with said rack, a spring connected with said pinion, and a rotatable fly-ball device actuated by said spring.

9. In a device of the character described, coin-operated controlling means comprising a slidable member for receiving a coin, a horizontally-disposed rack carried by said member, a timing device set in operation upon the sliding movement of said member, including a pinion meshing with said rack, a spring connected with said pinion, a rotatable fly-ball device actuated by said spring, and means actuated by said fly-ball device for again setting the timing mechanism at the completion of one timing operation.

10. In a device of the character described, indicating means, means for locking the indicating means in inoperative position, including a brake, a brake rod for throwing said brake into and out of locking position, coin-operated releasing means comprising a slidable member, a rack movable with said member, a timing device set in operation upon the sliding movement of said member, including a pinion meshing with the rack, a rotatable centrifugal device actuated from said pinion, and means for connecting the centrifugal device with said brake rod.

11. In a device of the character described, indicating means, means for locking the indicating means in inoperative position, including a brake, a brake rod for throwing said brake into and out of locking position, coin-operated releasing means comprising a slidable member, a rack movable with said member, a timing device set in operation upon the sliding movement of said member, including a pinion meshing with the rack, a centrifugal device actuated from said pinion, and means for connecting the centrifugal device with said brake rod, including an adjustable connecting rod.

12. In a device of the character described, indicating means, means for locking the indicating means in inoperative position, including a brake, a brake rod for throwing said brake into and out of locking position, coin-operated releasing means comprising a slidable member, a rack movable with said member, a timing device set in operation upon the sliding movement of said member, including a pinion meshing with the rack, a centrifugal device actuated from said pinion, a sleeve movable with the centrifugal device, a rock shaft actuated upon movement of the sleeve, and a connecting rod between the rock shaft and said brake rod.

13. In a device of the character described, indicating means, means for locking the indicating means in inoperative position, including a brake, a brake rod for throwing said brake into and out of locking position, coin-operated releasing means comprising a slidable member, a rack movable with said member, a timing device set in operation upon the sliding movement of said member, including a pinion meshing with the rack, a rotatable centrifugal device actuated from said pinion, a sleeve movable with the centrifugal device, a rock shaft actuated upon movement of the sleeve, and means for actuating the brake rod upon movement of the rock shaft, including an adjustable connecting rod.

14. In a coin-operated controlling device, in combination, a slidable member, a rack carried thereby, a pinion meshing with said rack, a spring connected to said pinion to be stressed by movement of said rack, a centrifugal device connected to said spring to be driven thereby, means for normally holding said centrifugal device against movement, means connected to said movable member for releasing said centrifugal device, and a machine controlling element operated by said centrifugal device.

15. In a coin-operated controlling device, a movable member, a spring connected with said movable member to be stressed by movement of said member, a centrifugal device connected to said spring to be driven thereby, means for normally holding said centrifugal device against movement, means connected to said movable member for releasing said holding means when said movable member nears its limit of movement, and a machine controlling element operated by said centrifugal device.

HUBERT A. MYERS.